United States Patent
Jung

(10) Patent No.: US 11,050,285 B2
(45) Date of Patent: Jun. 29, 2021

(54) BATTERY CHARGING METHOD AND APPARATUS

(71) Applicant: Samsung Electronics Co., Ltd., Suwon-si (KR)

(72) Inventor: Daeryong Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/707,070

(22) Filed: Dec. 9, 2019

(65) Prior Publication Data

US 2020/0119562 A1    Apr. 16, 2020

Related U.S. Application Data

(63) Continuation of application No. 15/255,482, filed on Sep. 2, 2016, now Pat. No. 10,536,018.

(30) Foreign Application Priority Data

Nov. 2, 2015 (KR) .......................... 10-2015-0153346

(51) Int. Cl.
*H02J 7/00* (2006.01)
*H02J 7/04* (2006.01)
*B60L 53/10* (2019.01)

(52) U.S. Cl.
CPC ............... *H02J 7/007* (2013.01); *B60L 53/11* (2019.02); *H02J 7/0029* (2013.01); *H02J 7/0071* (2020.01); *H02J 7/0077* (2013.01); *H02J 7/045* (2013.01); *B60L 2240/547* (2013.01); *B60L 2240/549* (2013.01); *H02J 7/00302* (2020.01); *H02J 7/00304* (2020.01); *Y02T 10/70* (2013.01);
(Continued)

(58) Field of Classification Search
CPC ...................................................... H02J 7/007
USPC ........................................................ 320/106
See application file for complete search history.

(56) References Cited

U.S. PATENT DOCUMENTS 6,104,165 A * 8/2000 Miyamoto ............ H01M 10/44
320/125
8,754,614 B2   6/2014 Paryani et al.
(Continued)

FOREIGN PATENT DOCUMENTS

CN    104810873 A    7/2015
CN    104810877 A    7/2015
(Continued)

OTHER PUBLICATIONS

Extended European Search Report dated Apr. 11, 2017 in counterpart European Application No. 16196802.9 (7 pages in English).
(Continued)

*Primary Examiner* — Jerry D Robbins
(74) *Attorney, Agent, or Firm* — NSIP Law

(57) ABSTRACT

A battery charging method includes determining a battery overpotential based on a reference physical quantity and a battery physical quantity corresponding to a charging capacity of a battery while charging the battery in an initial charging step, determining whether a condition for changing a battery charging step is satisfied based on the battery overpotential, and changing the battery charging step from the initial charging step to an adjusted charging step in response to the condition being satisfied.

19 Claims, 13 Drawing Sheets

(52) U.S. Cl.
CPC ............ *Y02T 10/7072* (2013.01); *Y02T 90/12* (2013.01); *Y02T 90/14* (2013.01)

(56) References Cited

U.S. PATENT DOCUMENTS

| | | | |
|---|---|---|---|
| 2006/0093894 A1 | 5/2006 | Scott et al. | |
| 2007/0229034 A1 | 10/2007 | Tatebayashi et al. | |
| 2010/0213901 A1 | 8/2010 | Morimoto et al. | |
| 2011/0006776 A1* | 1/2011 | Ishikawa | G01R 31/367 324/429 |
| 2011/0054816 A1* | 3/2011 | Prada | G01R 31/367 702/63 |
| 2012/0032648 A1* | 2/2012 | Ghantous | H02J 7/00 320/139 |
| 2014/0225573 A1* | 8/2014 | Watanabe | H02J 11/00 320/155 |

FOREIGN PATENT DOCUMENTS

| | | |
|---|---|---|
| JP | 2599333 B2 | 4/1997 |
| JP | 3758361 B2 | 3/2006 |
| JP | 2008-206259 A | 9/2008 |
| JP | 2015-104139 A | 6/2015 |
| KR | 2000-0019006 A | 4/2000 |
| KR | 10-1367161 B1 | 2/2014 |
| KR | 10-2014-0044105 A | 4/2014 |
| WO | WO 2008/102528 A1 | 8/2008 |

OTHER PUBLICATIONS

Chinese Office Action dated Jul. 29, 2020 in counterpart to Chinese Patent Application No. 201610927692.3 (12 pages in English and 9 pages in Chinese).

Japanese Office Action dated Sep. 1, 2020 in counterpart Japanese Patent Application No. 2016-211849 (3 pages, in English, 6 pages in Japanese).

* cited by examiner

BATTERY CHARGING METHOD AND APPARATUS

CROSS-REFERENCE TO RELATED APPLICATION(S)

This application is a continuation of U.S. patent application Ser. No. 15/255,482 filed on Sep. 2, 2016, which claims the benefit under 35 USC 119(a) of Korean Patent Application No. 10-2015-0153346 filed on Nov. 2, 2015, in the Korean Intellectual Property Office, the entire disclosure of which is incorporated herein by reference for all purposes.

BACKGROUND

1. Field

The following description relates to a battery charging method and a battery charging apparatus.

2. Description of Related Art

A battery may be charged using various charging methods. In one example, in a constant current and constant voltage charging method, a battery is charged with a constant current until the battery voltage reaches a preset voltage, and is then charged at a constant voltage. In another example, in a varying current decay charging method, a battery is charged with a high current in a low state of charge (SOC) until the battery reaches a preset SOC, and is then charged with a gradually decreasing current. In another example, the battery is charged using a fast charging method. However, when a battery is repeatedly charged using a fast charging method, the battery life may be rapidly reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a battery charging method includes determining a battery overpotential based on a reference physical quantity and a battery physical quantity corresponding to a charging capacity of a battery while charging the battery in an initial charging step; determining whether a condition for changing a battery charging step is satisfied based on the battery overpotential; and changing the battery charging step from the initial charging step to an adjusted charging step in response to the condition being satisfied.

A charging current value in the adjusted charging step may be less than a charging current value in the initial charging step.

The condition may include a first condition defined as a case in which the battery overpotential is greater than or equal to a threshold voltage.

The threshold voltage may be determined based on a function in which a value corresponding to the charging capacity decreases as the charging capacity increases.

The condition may further include a second condition defined as a case in which a charging time of the battery in the initial charging step is greater than or equal to a duration of the initial charging step, and a third condition defined as a case in which the battery physical quantity in the initial charging step is greater than or equal to a step voltage value of the initial charging step; and the changing may include changing the battery charging step to the adjusted charging step in response to any one of the first condition, the second condition, and the third condition being satisfied.

The changing may include performing an early termination of the initial charging step in response to the battery overpotential being greater than or equal to a threshold voltage; updating a battery charging step index in response to the early termination of the initial charging step; comparing the updated charging step index to a preset number of charging steps; and changing the battery charging step to the adjusted charging step in response to the updated charging step index being less than or equal to the preset number of steps.

The battery overpotential may be a difference between the battery physical quantity and the reference physical quantity.

The battery charging method may further include comparing a battery physical quantity measured before charging the battery in the initial charging step to a preset physical quantity; determining the initial charging step based on the measured battery physical quantity in response to the measured battery physical quantity being greater than the preset physical quantity; and charging the battery in the initial charging step in response to the determining of the initial charging step.

The battery charging method may further include comparing a battery physical quantity measured before charging the battery in the initial charging step to a preset physical quantity; charging the battery with a constant current in response to the measured battery physical quantity being less than or equal to the preset physical quantity; comparing a battery physical quantity of the battery charged with the constant current to the preset physical quantity; and charging the battery in the initial charging step in response to the battery physical quantity of the battery charged with the constant current being greater than the preset physical quantity.

In another general aspect, a battery charging method includes charging a battery in a slow charging mode based on battery state information; charging the battery in an initial charging step of a fast charging mode including a plurality of battery charging steps in response to the charging in the slow charging mode; determining whether a condition for changing a battery charging step of the fast charging mode is satisfied based on a result of the charging performed in the initial charging step; changing from the initial charging step to the adjusted charging step based in response to the condition being satisfied; and charging the battery in the adjusted charging step; wherein the condition may include a first condition defined as a case in which a battery overpotential is greater than or equal to a threshold voltage, the battery overpotential being determined based on a battery physical quantity corresponding to a charging capacity of the battery and a reference physical quantity corresponding to the charging capacity of the battery.

A charging current value in the adjusted charging step may be less than a charging current value in the initial charging step.

The threshold voltage may be determined based on a function in which a value corresponding to the charging capacity decreases as the charging capacity increases.

The condition may further include a second condition defined as a case in which a charging time of the battery in the initial charging step is greater than or equal to a duration of the initial charging step, and a third condition defined as a case in which the battery physical quantity in the initial charging step is greater than or equal to a step voltage value of the initial charging step; and the changing may include changing the battery charging step to the adjusted charging step in response to any one of the first condition, the second condition, and the third condition being satisfied.

The changing may include performing an early termination of the initial charging step in response to the battery overpotential being greater than the threshold voltage; updating a battery charging step index in response to the early termination of the initial charging step; comparing the updated battery charging step index to a preset number of steps; and changing the battery charging step to the adjusted charging step in response to the updated battery charging step index being less than or equal to the preset number of steps.

The battery overpotential may be a difference between the battery physical quantity and the reference physical quantity.

The charging of the battery in the slow charging mode may include comparing a measured battery physical quantity to a preset physical quantity; determining the initial charging step based on the measured battery physical quantity in response to the measured battery physical quantity being greater than the preset physical quantity; and charging the battery with a constant current for a desired period of time in response to the determining of the initial charging step.

The charging of the battery in the slow charging mode may include comparing a measured battery physical quantity to a preset physical quantity; charging the battery with a constant current in response to the measured battery physical quantity being less than or equal to the preset physical quantity; comparing a battery physical quantity of the battery charged with the constant current to the preset physical quantity; and continuing to charge the battery with the constant current until the battery physical quantity of the battery charged with the constant current is greater than the preset physical quantity.

In another general aspect, a battery charging apparatus includes an interface configured to receive a battery physical quantity; and a processor configured to determine a battery overpotential based on a battery physical quantity corresponding to a charging capacity of a battery and a reference physical quantity corresponding to the charging capacity of the battery while charging the battery in an initial charging step, determine whether a condition for changing a battery charging step is satisfied based on the battery overpotential, and change the battery charging step from the initial charging step to the adjusted charging step in response to the condition being satisfied.

In another general aspect, a battery charging method includes determining an initial charging step of a fast charging mode including a plurality of battery charging steps based on an initial state of a battery; charging the battery in the initial charging step; and changing to a next battery charging step in response to a battery overpotential of the battery being greater than or equal to a threshold voltage; wherein the battery overpotential is a difference between a voltage of the battery and a reference voltage.

The battery charging method may further include charging the battery in a slow charging mode before charging the battery in the fast charging mode; wherein the charging of the battery in the slow charging mode may include charging the battery in the slow charging mode until the voltage of the battery is greater than a preset voltage in response to the initial voltage being less than or equal to the preset voltage; and charging the battery in the slow charging mode for a preset time in response to the initial voltage being greater than the preset voltage.

The charging of the battery in the slow charging mode may further include charging the battery with a constant current that is at least one order of magnitude smaller than a minimum step charging current of the battery charging steps of the fast charging mode.

The battery charging mode may further include charging the battery in a constant current mode after completion of the fast charging mode until the voltage of the battery reaches a maximum charging voltage.

Each of the battery charging steps may have a step voltage that is greater than the step voltage of a preceding one of the battery charging steps; the initial state of the battery may be an initial voltage of the battery; and the determining of the initial charging step may include determining the initial charging step to be a first battery charging step of the battery charging steps in response to the initial voltage being less than or equal to a preset voltage; and determining the initial charging step to be a first one of the battery charging steps having a step voltage that is greater than the initial voltage in response to the initial voltage being greater than the preset voltage.

Each of the battery charging steps may have a step charging current that is less than the step charging current of a preceding one of the battery charging steps.

The changing may include changing to the next battery charging step in response to any one of the battery overpotential of the battery being greater than or equal to the threshold voltage, a charging time of a charging step being performed being greater than or equal to a step duration of the charging step being performed, and the voltage of the battery during the charging step being performed being greater than or equal to a step voltage of the charging step being performed.

The reference voltage may be a voltage of the battery during a constant current charging mode that increases as a charging capacity of the battery increases during charging.

The threshold voltage may decrease as a charging capacity of the battery increases during charging.

In another general aspect, a non-transitory computer-readable storage medium stores instructions that, when executed by a processor, cause the processor to perform the method described above.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include, "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
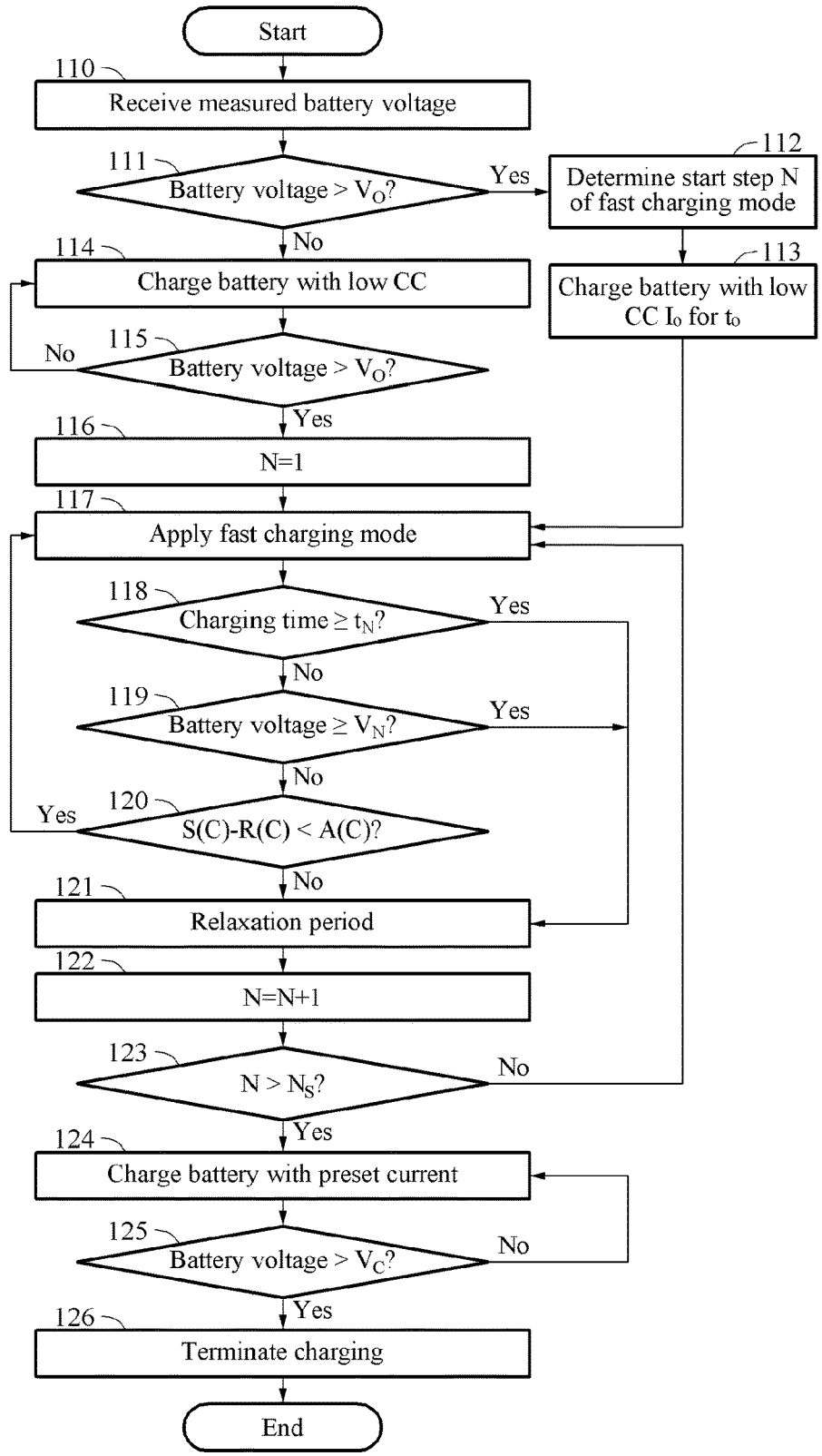
FIG. 1 illustrates an example of a battery charging method.

FIG. 1 illustrates an example of a battery charging method. The battery charging method is performed by a battery charging apparatus.

Referring to FIG. 1, in operation 110, the battery charging apparatus receives a measured battery voltage. A sensor connected to a battery measures a battery voltage and transmits the measured battery voltage to the battery charging apparatus.

In operation 111, the battery charging apparatus compares the measured battery voltage to a preset voltage $V_0$, for example, 3.35 volts (V). When it is determined in operation 111 that the measured battery voltage is greater than $V_0$, the battery charging apparatus determines a start step of a fast charging mode based on the measured battery voltage in operation 112. The start step determined in operation 112 is an initial charging step of the fast charging mode.

TABLE 1

| N-th battery charging step | Current $I_N$ (A) | Time $t_N$ (min) | Voltage $V_N$ (V) |
| --- | --- | --- | --- |
| N = 1 | 4.125 | 8 | 3.85 |
| N = 2 | 3.3 | 15 | 4.00 |
| N = 3 | 2.75 | 6 | 4.06 |
| N = 4 | 1.65 | 20 | 4.15 |

For example, a memory included in the battery charging apparatus stores the contents of Table 1 above, and the battery charging apparatus determines the start step of the fast charging mode in operation 112 based on the contents of Table 1. Assuming, for example, that the measured battery voltage is 3.9 V, the battery charging apparatus compares the measured battery voltage of 3.9 V to the voltages in Table 1. Since the measured battery voltage of 3.9 V is greater than a voltage 3.85 V of a first battery charging step in Table 1 and less than a voltage 4.00 V of a second battery charging step in Table 1, the battery charging apparatus determines the second battery charging step to be the start step. Thus, in this example, the second battery charging step is the initial charging step of the fast charging mode. When there are $N_s$ battery charging steps in the fast charging mode, the battery charging apparatus determines to charge the battery starting from an N-th battery charging step of the $N_s$ battery charging steps based on the measured battery voltage.

Although though the foregoing example is based on Table 1, the contents of Table 1 are merely an example, and the information used to determine the start step is not limited to the contents of Table 1.

In response to the determination of the start step in operation 112, in operation 113, the battery charging apparatus charges the battery with a low constant current (CC) $l_0$, for example, 0.04 amperes (A), for a preset period of time to, for example, one minute (min). However, these are merely examples, and $l_0$ and to are not limited thereto. $l_0$ may be at least one order of magnitude smaller than a minimum step charging current of the battery charging steps of the fast charging mode (for example, 1.65 A in the example in Table 1 above), but this is merely an example, and $l_0$ is not limited thereto.

When the measured battery voltage is determined to be less than or equal to $V_0$ in operation 111, the battery charging apparatus charges the battery until the battery voltage reaches $V_0$. That is, when the measured battery voltage is determined to be less than or equal to $V_0$ in operation 111, in operation 114, the battery charging apparatus charges the battery with a low CC, for example, the low CC $l_0$ referred to above. In operation 115, the battery charging apparatus re-compares a battery voltage measured after the charging with the low CC to $V_0$. When the re-compared battery voltage is determined to be less than or equal to $V_0$ in operation 115, the battery charging apparatus continues charging the battery with the low CC in operation 114. When the re-compared battery voltage is determined to be greater than $V_0$ in operation 115, in operation 116, the battery charging apparatus determines to charge the battery in the fast charging mode starting from the first battery charging step in Table 1, that is, the battery charging step corresponding to N=1. In this case, the initial charging step of the fast charging mode is the first step of the fast charging mode.

To reduce a battery internal shock occurring due to the fast charge charging mode, the battery charging apparatus charges the battery in the low CC mode in operation 113 or 114 before charging the battery in the fast charging mode. After the battery has been charged in the low CC mode, the battery charging apparatus applies a fast charging mode in operation 117. The fast charging mode includes a plurality of battery charging steps. In response to the applying of the fast charging mode, the battery charging apparatus charges the battery in the initial charging step determined in either operation 112 or operation 116 depending on a result of operation 111. The initial charging step is either the N-th battery charging step that was determined in operation 112, for example, the battery charging step corresponding to N=2 in Table 1 as described above, or the battery charging step corresponding to N=1 in Table 1 that was determined in operation 116, depending on a result of operation 111.

In operation 118, the battery charging apparatus determines whether a charging time of the initial charging step is greater than or equal to a time $t_N$ corresponding to a duration of the initial charging step. For example, when the initial charging step is the second battery charging step in Table 1 as described above, the battery charging apparatus determines whether a charging time of the second battery charging step is greater than or equal to 15 minutes as shown in Table 1. When the charging time is determined to be greater than or equal to $t_N$ in operation 118, the battery charging apparatus enters a relaxation period in operation 121. For example, the battery charging apparatus enters the relaxation period by stopping a supply of voltage and/or current to the battery.

When the charging time is determined to be less than $t_N$ in operation 118, the battery charging apparatus determines in operation 119 whether the battery voltage is greater than or equal to a step voltage value $V_N$ corresponding to the initial charging step. For example, when the initial charging step is the second battery charging step in Table 1 as described above, the battery charging apparatus determines whether a battery voltage in the second charging step is greater than or equal to 4.00 V as shown in Table 1. When the battery voltage reaches $V_N$, the battery charging apparatus enters the relaxation period in operation 121.

When the battery voltage is determined to be less than $V_N$ in operation 119, in operation 120, the battery charging apparatus determines whether S(C)−R(C)<A(C). C denotes a charging capacity, S(C) denotes a battery voltage corresponding to the charging capacity, and is measured while the battery is being charged, R(C) denotes a reference voltage corresponding to the charging capacity, and A(C) denotes a threshold voltage. A battery overpotential is defined as a difference between the battery voltage S(C) corresponding to the charging capacity and the reference voltage R(C) corresponding to the charging capacity. That is, the battery overpotential is defined as S(C)−R(C). The battery overpotential is explained in greater detail below.

When it is determined in operation 120 that the battery overpotential is greater than or equal to the threshold voltage, the battery charging apparatus enters the relaxation period in operation 121.

When it is determined in operation 120 that the battery overpotential is less than the threshold voltage in operation 120, the battery charging apparatus continues charging the battery in the initial charging step of the fast charging mode in operation 117.

Thus, as described above, the battery charging apparatus determines whether any one of a charging time condition, a battery voltage condition, and a battery overpotential condition is satisfied in the initial charging step of the fast charging mode, and enters a relaxation period before performing a subsequent battery charging step of the fast charging mode if any one of the conditions is satisfied, or continues charging the battery in the initial charging step of the fast charging mode if none of the conditions are satisfied.

In operation 122, the battery charging apparatus sets N to be equal to N+1, that is, sets N=N+1. In operation 123, the battery charging apparatus determines whether N set in operation 122 is greater than a total number $N_s$ of battery charging steps in the fast charging mode. In the example of the fast charging mode in Table 1 above that has four battery charging steps, $N_s$=4. When it is determined in operation 123 that N set in operation 122 is less than or equal to $N_s$, the battery charging apparatus charges the battery in the subsequent charging step of the fast charging mode in operation 117.

When it is determined in operation 123 that N set in operation 122 is greater than $N_s$, the fast charging mode is terminated, and the battery charging apparatus charges the battery with a preset current in operation 124. For example, the preset current may be 0.825 A when the fast charging mode in Table 1 is used. While the battery is being charged with the preset current, the battery voltage increases and the battery charging apparatus compares the battery voltage to a maximum charging voltage $V_c$ in operation 125. For example, the maximum charging voltage $V_c$ may be 4.17 V when the fast charging mode in Table 1 is used.

When it is determined in operation 125 that the battery voltage is less than $V_c$, the battery charging apparatus continues to charge the battery with the preset current in operation 124. When it is determined in operation 125 that the battery voltage is greater than or equal to $V_c$, the battery charging apparatus terminates the charging in operation 126.

Figure 2:
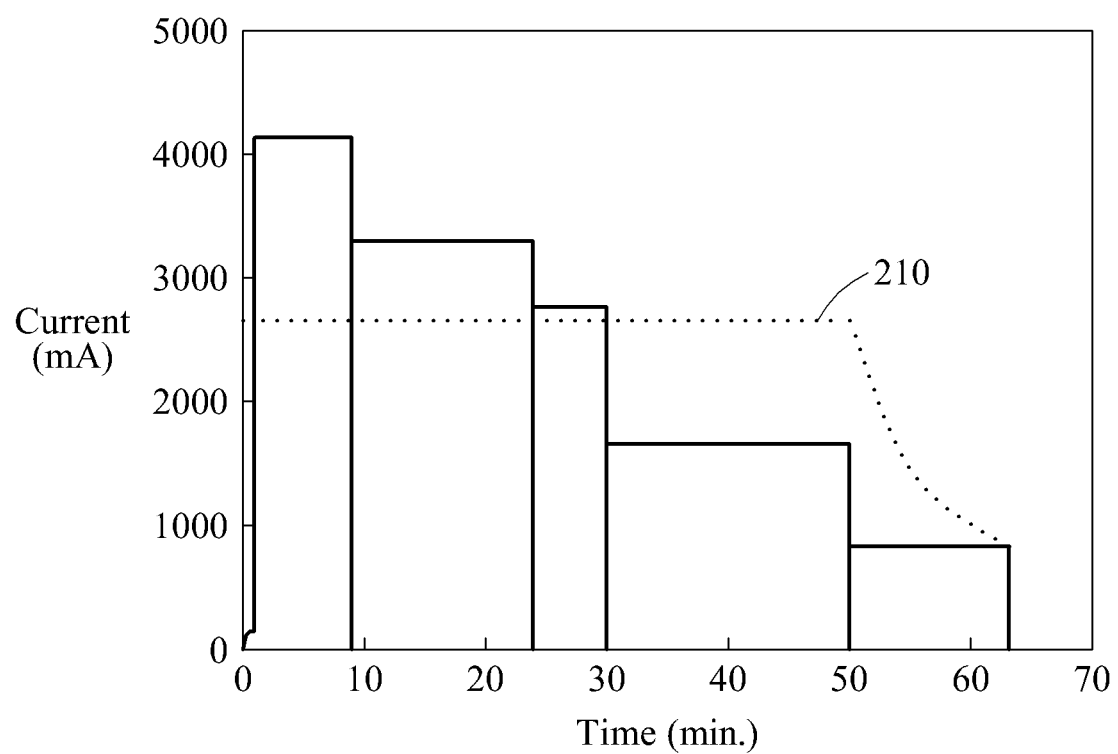
FIG. 2 illustrates an example of a battery charging step.

FIG. 2 illustrates an example of a battery charging step.

FIG. 2 illustrates examples of current values corresponding to each of a constant current and constant voltage charging mode and a fast charging mode including a plurality of battery charging steps.

When the battery charging apparatus operates in the constant current and constant voltage charging mode, the battery charging apparatus charges a battery with a constant current. As indicated by a graph 210, the battery charging apparatus charges the battery with the constant current for a preset period of time. In this example, the battery charging apparatus charges the battery until a battery voltage reaches a preset voltage. When the battery voltage reaches the preset voltage, the battery charging apparatus charges the battery at a constant voltage. As indicated by a graph 210, the current value decreases after the preset period of time.

When the battery charging apparatus is operates in the fast charging mode, the battery charging apparatus charges the battery based on in each of the plurality of battery charging steps of the fast charging mode. The battery charging apparatus charges the battery by sequentially performing the plurality of battery charging steps of the fast charging mode. In the example of FIG. 2, the battery charging apparatus charges the battery based on with a charging current value corresponding to each of the battery charging steps. A charging current value corresponding to a battery charging step decreases in each subsequent battery charging step of the fast charging mode. In FIG. 2, the first battery charging step corresponds to the low CC charging step with a charging current of 0.04 A that is performed in operation 114 in FIG. 1 before the fast charging mode is performed, the next four charging steps correspond to the four charging steps of the fast charging mode in Table 1 above with charging currents of 4.125 A, 3.3 A, 2.75 A, and 1.65 A that are performed in operations 117 to 123 in FIG. 1, and the last charging step corresponds to the preset current charging step with a charging current of 0.825 A that is performed in operation 124 in FIG. 1.

In one example, when the battery charging apparatus is charging the battery in a battery charging step, the battery charging apparatus determines a battery overpotential and determines whether the battery overpotential is greater than or equal to a threshold voltage. When the battery overpotential is greater than or equal to the threshold voltage, the battery charging apparatus performs early termination of the charging step and charges the battery in a subsequent battery charging step.

Figure 3:
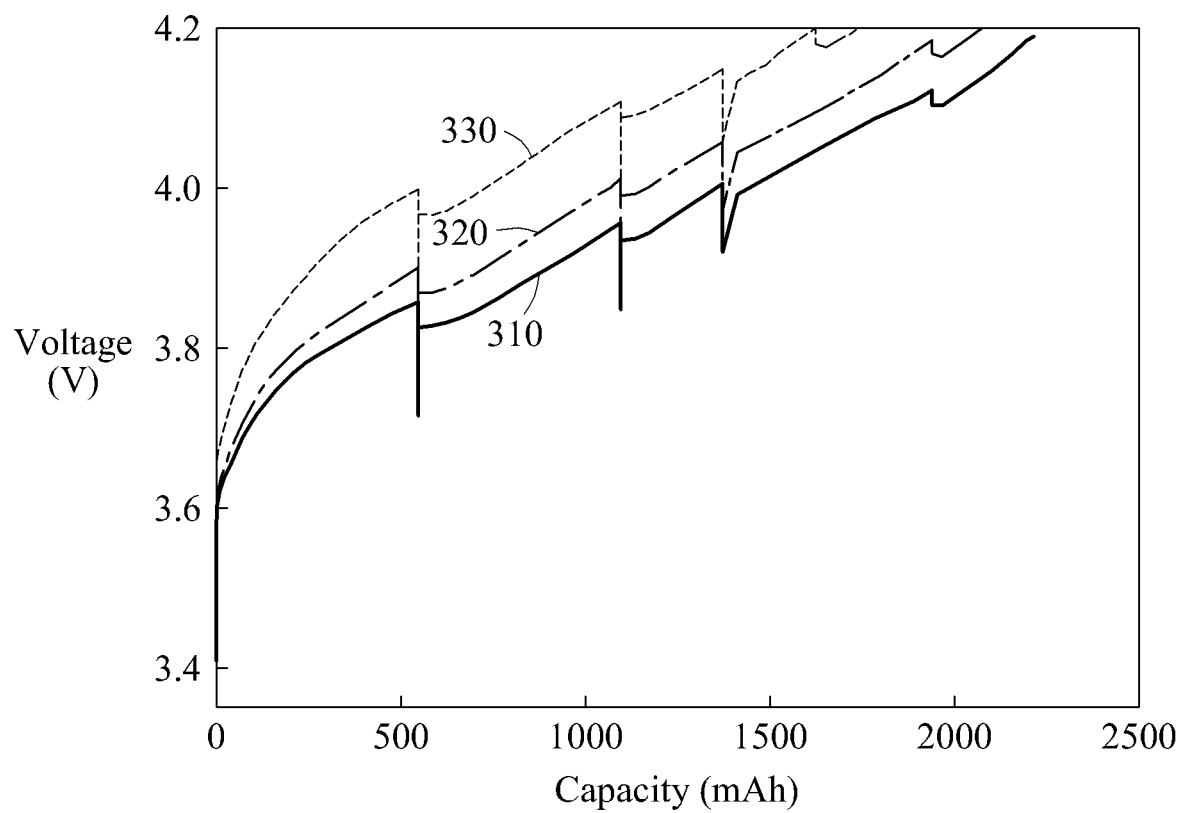
FIGS. 3 and 4 illustrate examples of a change in a battery overpotential.
Figure 4:
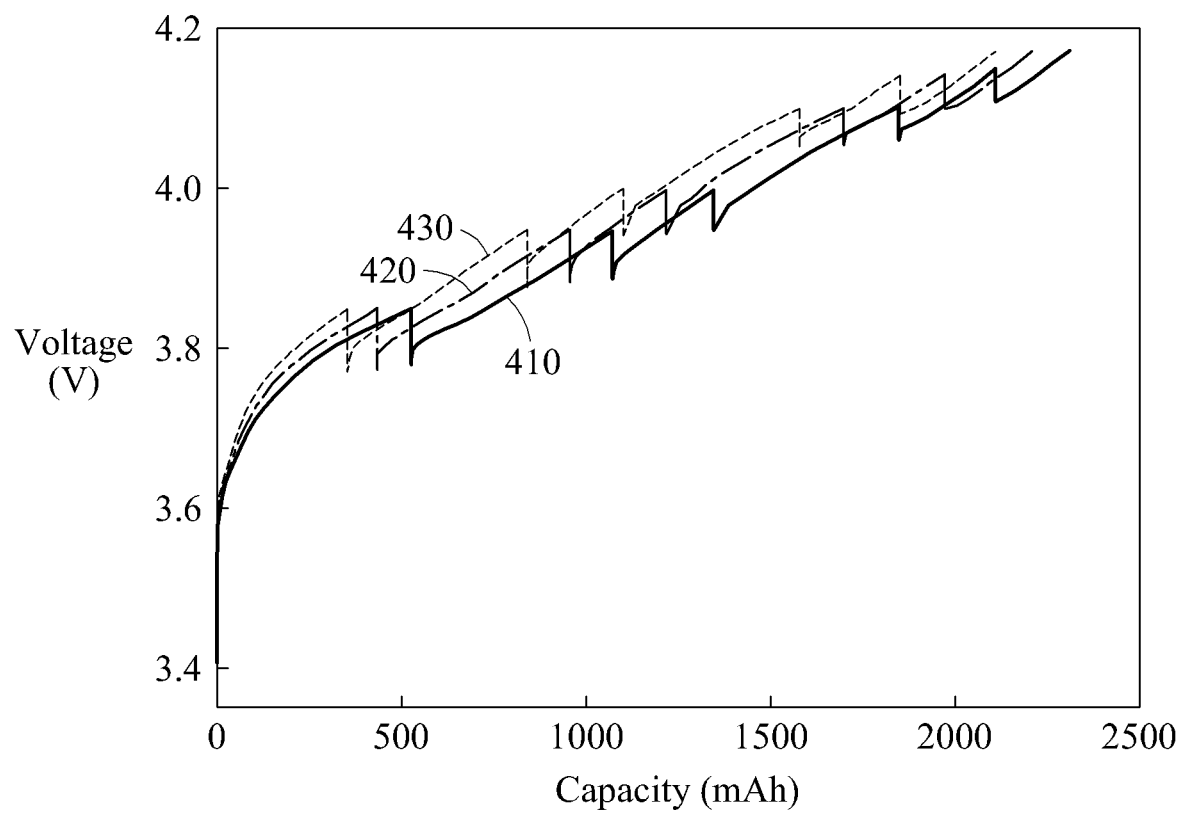

FIGS. 3 and 4 illustrate examples of a change in a battery overpotential.

FIG. 3 illustrates examples of a voltage to charging capacity graph when only the charging time condition in operation 118 in FIG. 1 is applied while charging a battery. In FIG. 3, a graph 310 represents a voltage of a first cycle count, for example, a battery voltage value measured in a first cycle. A graph 320 represents a voltage of a second cycle count, for example, a battery voltage value measured in a 30th cycle. A graph 330 represents a voltage of a third cycle count, for example, a battery voltage value measured in a 45th cycle.

When a cycle count increases, a charging voltage corresponding to a preset charging capacity also increases. In the example of FIG. 3, when the charging capacity is 500 milliampere-hours (mAh), a charging voltage of the graph 330 is greater than charging voltages of the graphs 310 and 320. When the battery is repetitively charged and discharged, a battery internal resistance increases and the charging voltage increases. In this example, when the cycle count increases, the charging voltage increases and the battery overpotential also increases.

FIG. 4 illustrates examples of a voltage to charging capacity graph when both the charging time condition in operation 118 in FIG. 1 and the battery voltage condition in operation 119 in FIG. 1 are applied while charging a battery.

In FIG. 4, a graph 410 represents a voltage of a first cycle count, a graph 420 represents a voltage of a second cycle count, and a graph 430 represents a voltage of a third cycle count.

A charging voltage of the graph 420 is less than a charging voltage of the graph 320 of FIG. 3. Similarly, a charging voltage of the graph 430 is less than a charging voltage of the graph 330 of FIG. 3. Thus, a battery overpotential decreases in the example of FIG. 4 when compared to the example of FIG. 3 as a result of applying both the charging time condition in operation 118 in FIG. 1 and the battery voltage condition in operation 119 in FIG. 1 while charging a battery.

Figure 5:
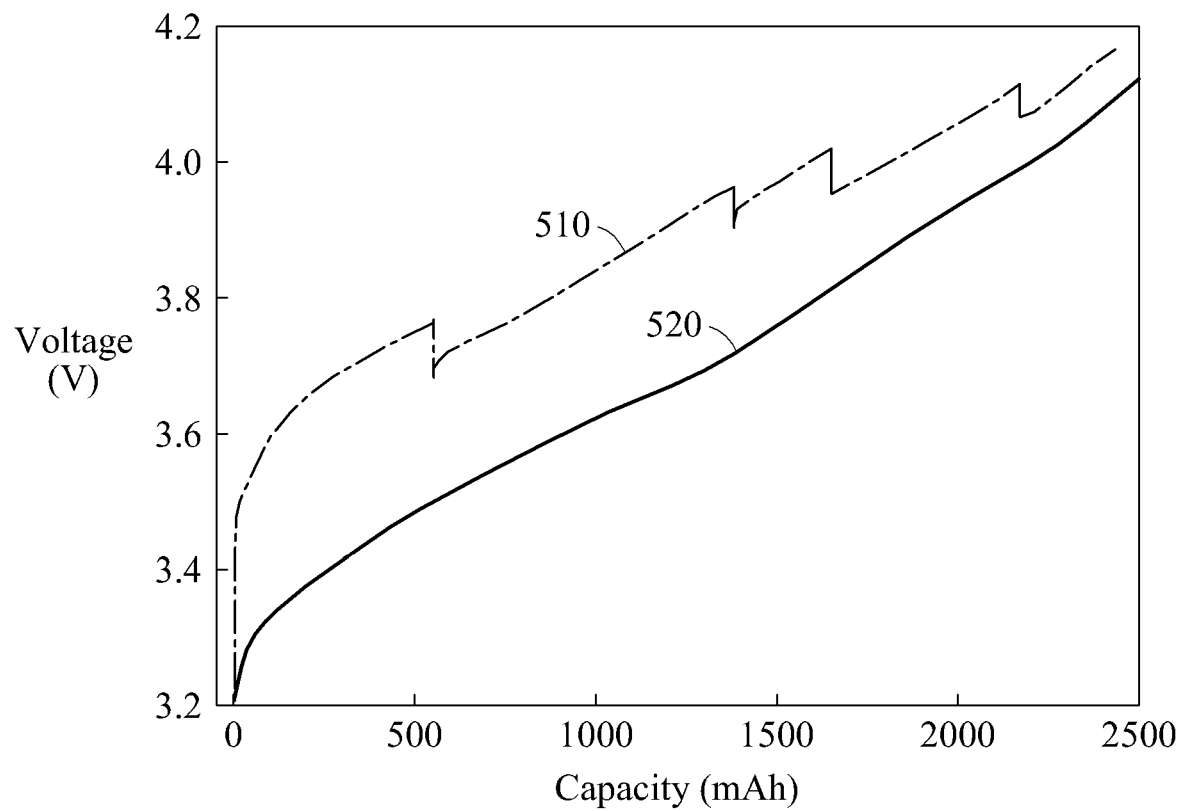
FIG. 5 illustrates examples of a battery physical quantity and a reference physical quantity.

FIG. 5 illustrates examples of a battery physical quantity and a reference physical quantity.

FIG. 5 illustrates examples of a battery voltage function 510 and a reference voltage function 520. A battery physical quantity is, for example, a battery voltage, and a reference physical quantity is, for example, a reference voltage. The battery voltage function 510 is included in a charging profile, and the reference voltage function 520 is included in a reference charging profile.

In the battery voltage function 510, discontinuities of the battery voltage occur at certain charging capacities. The discontinuities of the battery voltage occur due to, for example, changes of a battery charging step.

The reference voltage function 520 is defined based on a charging capacity and a voltage of a battery charged with a constant current. The constant current may have a relatively low charge rate (C-rate), for example, 1 C-rate or less, for example, a 0.5 C-rate or a 0.3 C-rate. A battery charging step is not changed in the reference voltage function 520, so discontinuities of the battery voltage do not occur in the reference voltage 520. The battery voltage S(C) described above indicates, for example, a value of the battery voltage function 510 corresponding to a charging capacity C, and the reference voltage R(C) described above indicates, for example, a value of the reference voltage function 520 corresponding to the charging capacity C.

Figure 6A:
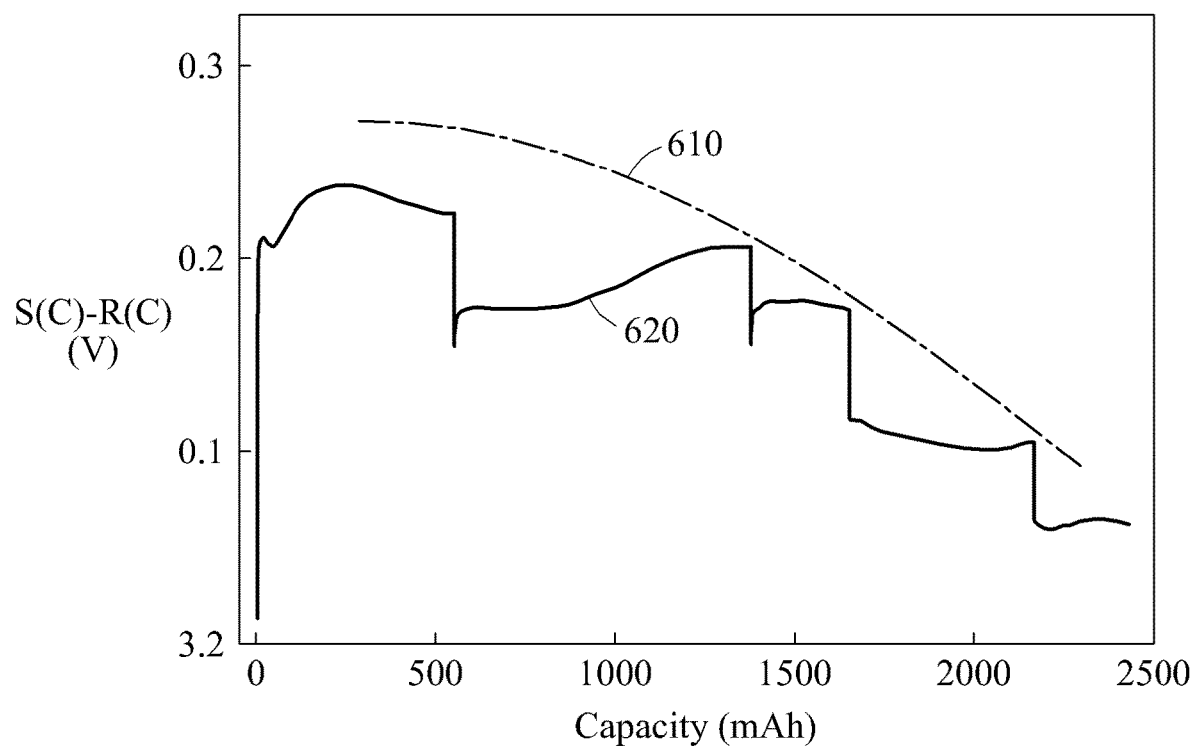
FIGS. 6A and 6B illustrate examples of a battery overpotential and a threshold voltage.
Figure 6B:
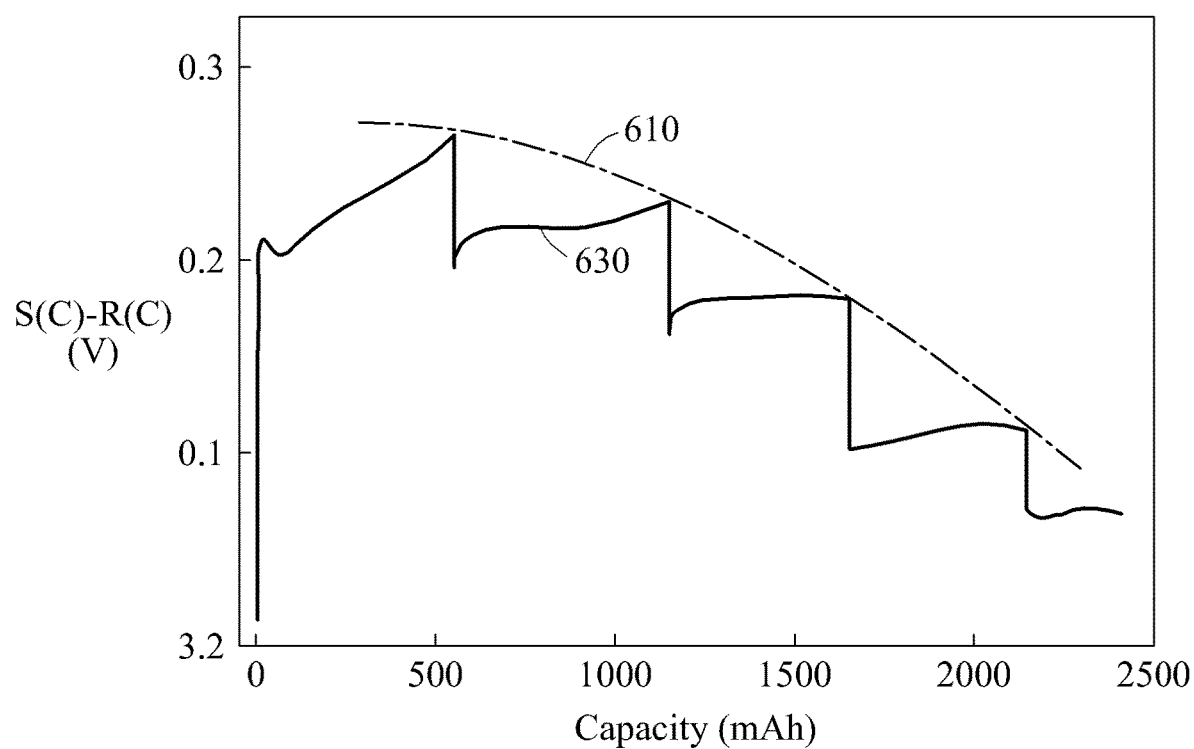

FIGS. 6A and 6B illustrate examples of a battery overpotential and a threshold voltage.

FIG. 6A illustrates examples of an overpotential limit function 610 and a battery overpotential function 620. The overpotential limit function 610 is a function in which a value corresponding to a charging capacity decreases as the charging capacity increases. The overpotential limit function 610 may be, for example, a polynomial function, for example, $\alpha+\beta*C+\gamma*C^2+\delta*C^3$, where $\alpha$, $\beta$, $\gamma$, and $\delta$ are constants. However, this is merely an example, and the overpotential limit function is not limited thereto. The threshold voltage A(C) described above indicates, for example, a value of the overpotential limit function value 610 corresponding to the charging capacity C.

In the example of FIG. 6A, a battery overpotential corresponding to the charging capacity is always less than the threshold voltage. That is, all of the battery charging steps terminate before the battery overpotential reaches the threshold voltage.

FIG. 6B illustrates an example of a battery voltage function 630. At certain charging capacities, the battery overpotential is equal to the threshold. When the battery overpotential is not monitored, the battery charging apparatus does not change a charging profile to charge a battery. However, in this example, the battery charging apparatus monitors the battery overpotential, compares the battery overpotential to the threshold voltage, and changes the charging profile when the battery overpotential reaches the threshold voltage. In this way, the battery charging apparatus changes a battery charging step so that the battery overpotential does not exceed the threshold voltage. The battery charging apparatus charges the battery with a charging current in the battery step after the change that is less than a charging current in the battery charging step before the change. The battery charging apparatus controls the charging of the battery to stay within an area in which the battery voltage function 630 is less than or equal to the overpotential limit function 610.

Figure 7:
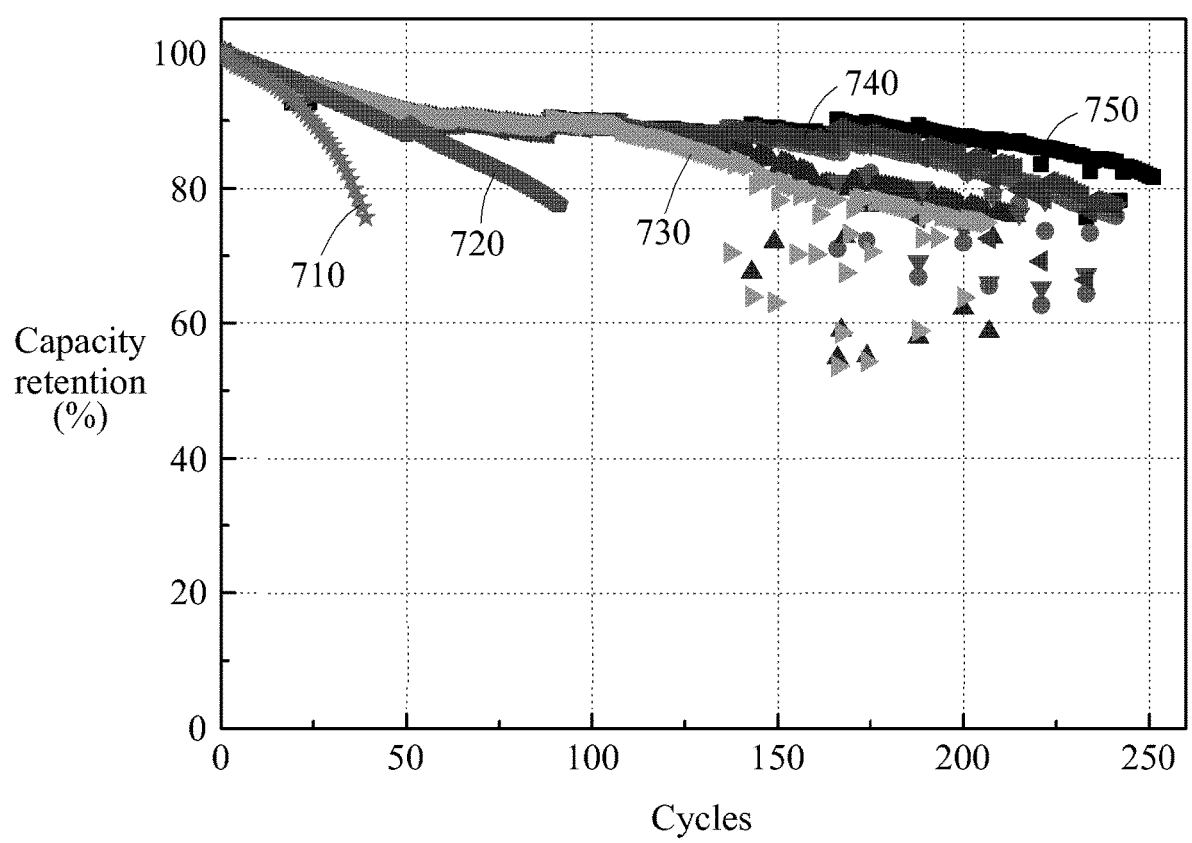
FIG. 7 illustrates examples of capacity retention.

FIG. 7 illustrates examples of capacity retention.

FIG. 7 illustrates examples of capacity retention rate based on a cycle count.

In FIG. 7, a graph 710 corresponds to a case in which a battery is charged in a constant current and constant voltage charging mode. A graph 720 corresponds to a case in which the battery is charged in a fast charging mode without applying an overpotential limit function. Graphs 730, 740, and 750 correspond to cases in which the battery is charged in the fast charging mode while applying the overpotential limit function.

In the graph 710, a cycle count at which a capacity retention rate decreases to 80% is less than 50.

In the graph 720, the cycle count at which the capacity retention rate decreases to 80% is about 100. When compared to the graph 710, the cycle count at which the capacity retention rate decreases to 80% increases in the graph 720.

In the graphs 730 and 740, the cycle count at which the capacity retention rate decreases to 80% is about 200. In the graph 750, the capacity retention rate corresponding to a 250th cycle is 80% or more. In contrast to the graphs 710 and 720, the overpotential limit function is applied to the graphs 730, 740, and 750. For this reason, a battery overpotential does not exceed a threshold voltage in a preset battery charging step. When the battery is charged in charging modes of the graphs 730, 740, and 750, a degree of degradation in a battery performance or a battery life is lower than that of the battery charged in charging modes of the graph 710 and 720 in the same cycle.

Figure 8:
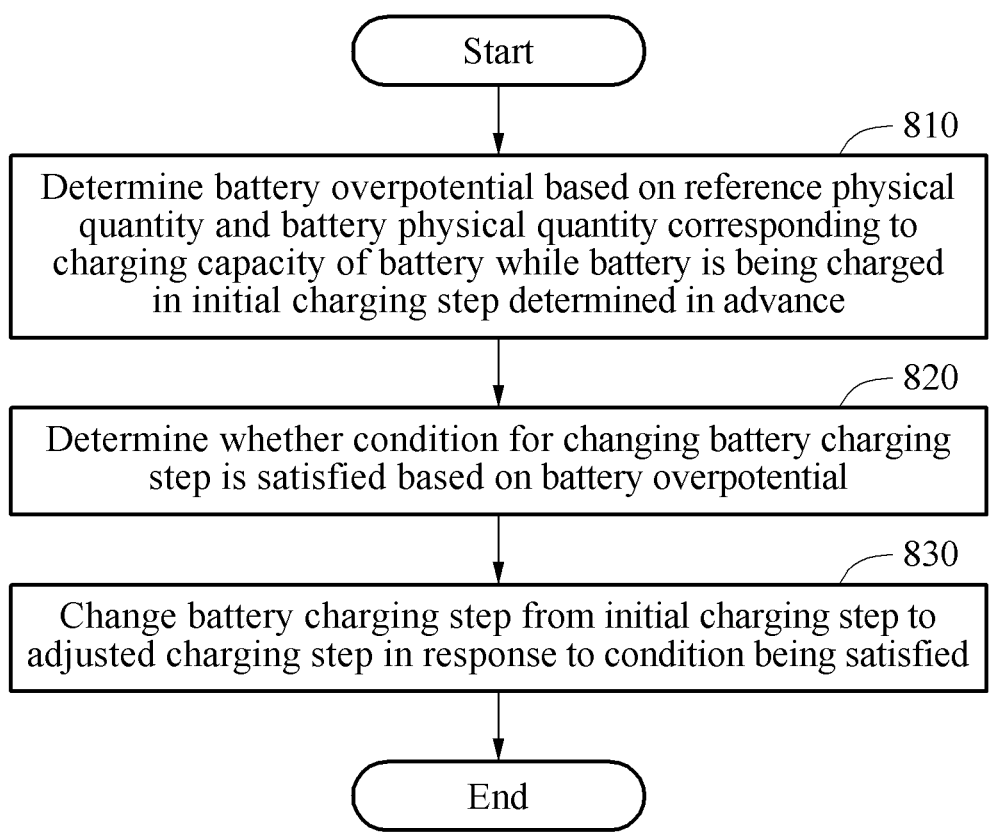
FIG. 8 illustrates another example of a battery charging method.

FIG. 8 illustrates another example of a battery charging method. The battery charging method of FIG. 8 is performed by a battery charging apparatus.

In operation 810, the battery charging apparatus determines a battery overpotential based on a reference physical quantity and a battery physical quantity corresponding to a charging capacity of a battery while the battery is being charged in an initial charging step determined in advance. The battery physical quantity may be, for example, a battery voltage. The reference physical quantity may be, for example, a reference voltage. The battery charging apparatus calculates a difference between a battery voltage corresponding to the charging capacity and a reference voltage corresponding to the charging capacity.

In operation 820, the battery charging apparatus determines whether a condition for changing a battery charging step is satisfied based on the battery overpotential. In one example, the condition includes a first condition defined as a case in which the battery overpotential is greater than or equal to a threshold voltage. In this example, the battery charging apparatus determines whether the battery overpotential is greater than or equal to the threshold voltage.

In another example, the condition also includes a second condition defined as a case in which a charging time of the battery in the initial charging step is greater than or equal to a duration of the initial charging step, and a third condition defined as a case in which the battery physical quantity in the initial charging step is greater than or equal to a step voltage value corresponding to the initial charging step. In this example, the battery charging apparatus determines whether any one of the first condition, the second condition, and the third condition is satisfied.

In operation 830, the battery charging apparatus changes the battery charging step from the initial charging step to an adjusted charging step based on a result of the determining. When any one of the first condition, the second condition, and the third condition is satisfied, the battery charging apparatus changes the battery charging step to the adjusted charging step. In one example, a charging current value in the adjusted charging step is less than the charging current value in the initial charging step. When any one of the first condition, the second condition, and the third condition is satisfied, the battery charging apparatus terminates the initial charging step and changes from the initial charging step to the adjusted charging step, thereby continuing to charge the battery.

When the battery overpotential is greater than or equal to the threshold voltage, the battery charging apparatus performs early termination of the initial charging step. The battery charging apparatus updates a battery charging step index based on the early termination, and compares the updated battery charging step index to a preset number of steps $N_s$. For example, when an index of the initial charging step is N, the battery charging apparatus sets N to be equal to N+1, that is, N=N+1, and compares N after the setting to $N_s$. When N is less than or equal to $N_s$, the battery charging apparatus changes the battery charging step to the adjusted charging step to charge the battery.

Since the descriptions provided with reference to FIGS. 1 through 7 are also applicable to FIG. 8, repeated descriptions with respect to FIG. 8 have been omitted for increased clarity and conciseness.

Figure 9:
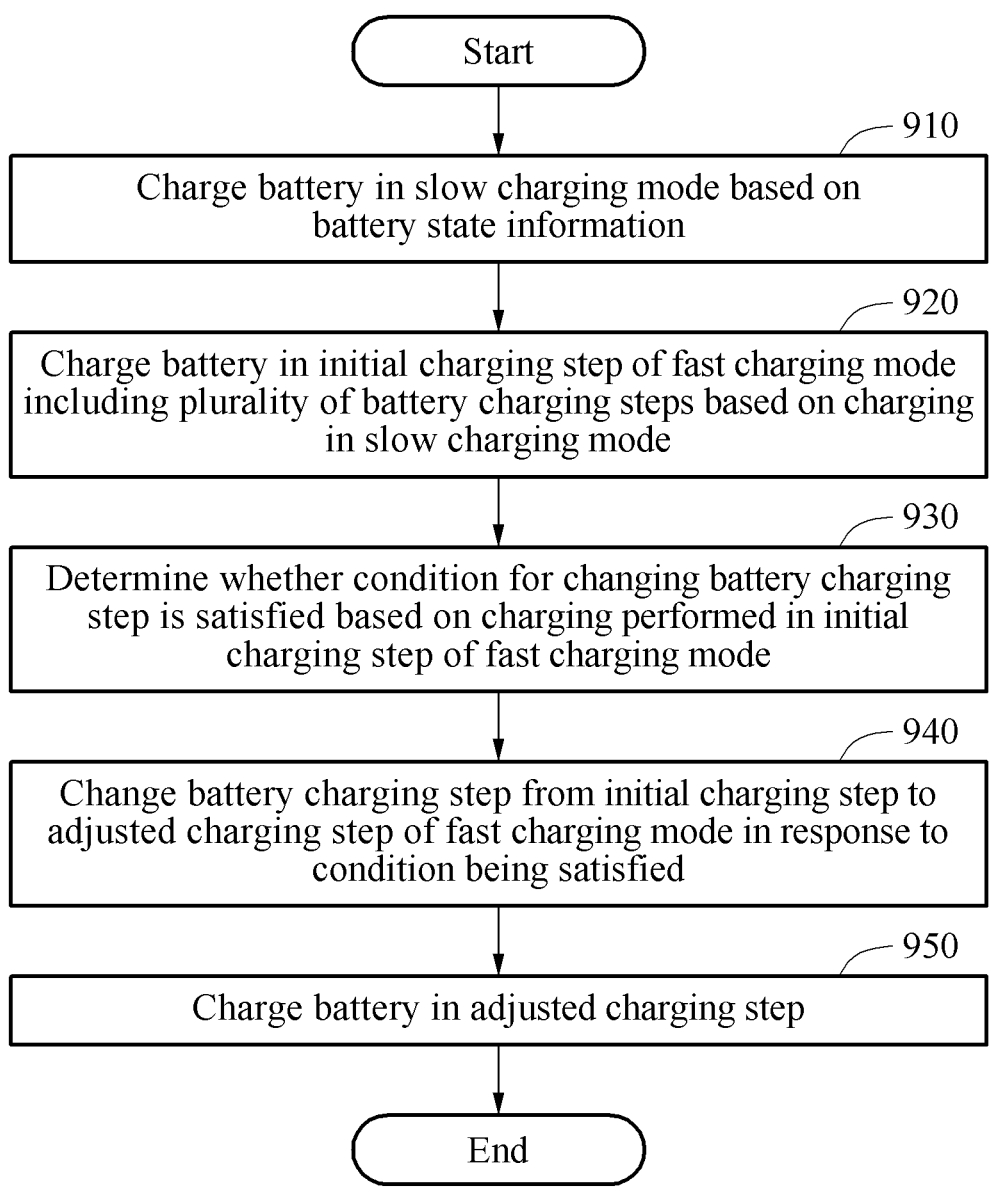
FIG. 9 illustrates another example of a battery charging method.

FIG. 9 illustrates another example of a battery charging method. The battery charging method of FIG. 9 is performed by battery charging apparatus.

Referring to FIG. 9, in operation 910, the battery charging apparatus charges a battery in a slow charging mode based on battery state information. The battery charging apparatus determines the battery state information. For example, the battery charging apparatus receives a measured battery physical quantity, and determines a state of charge (SOC) of the battery as the battery state information. The battery charging apparatus compares the measured battery physical quantity to a preset physical quantity. The preset physical quantity may be, for example, $V_0$ of FIG. 1.

When the measured battery physical quantity is greater than the preset physical quantity, the battery charging apparatus determines a start step of a fast charging mode including a plurality of battery charging steps based on the measured battery physical quantity. Also, the battery charging apparatus charges the battery with a low constant current (CC) for a preset period of time. The preset period of time may be, for example, $t_0$ of FIG. 1 and the constant current may be, for example, the low CC $I_0$ of FIG. 1. A high current value of a fast charging mode may cause a battery internal shock. To prevent the battery internal shock, the battery charging apparatus charges the battery with a low constant current before the fast charging mode is applied.

When the measured battery physical quantity is less than or equal to the preset physical quantity, the battery charging apparatus charges the battery with a low constant current without determining a start step of the fast charging mode. The constant current may be, for example, the low CC $I_0$ of FIG. 1. When the battery physical quantity of the battery being charged with the constant current exceeds the preset physical quantity, the battery charging apparatus charges the battery starting from a first battery charging step of the fast charging mode.

In operation 920, the battery charging apparatus charges the battery in an initial charging step of the fast charging mode including a plurality of battery charging steps based on the charging in the slow charging mode. The initial charging step is the start step determined by the battery charging apparatus when the measured battery physical quantity was greater than the preset physical quantity, or the first battery charging step when the measured battery physical quantity was less than or equal to the preset physical quantity. For example, when N is determined to be 2, for example, N=2, the battery charging apparatus charges the battery starting from a second battery charging step.

In operation 930, the battery charging apparatus determines whether a condition for changing the battery charging step is satisfied based on the charging performed in the initial charging step of the fast charging mode.

In operation 940, the battery charging apparatus changes the battery charging step from the initial charging step to an adjusted charging step of the fast charging mode in response to the condition being satisfied.

In operation 950, the battery charging apparatus charges the battery in the adjusted charging step.

Since the descriptions provided with reference to FIGS. 1 through 8 are also applicable to FIG. 9, repeated descriptions with respect to FIG. 9 have been omitted for increased clarity and conciseness.

Figure 10:
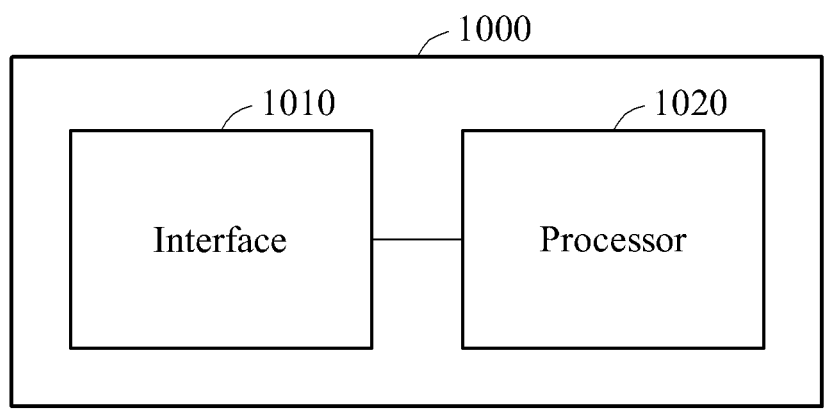
FIG. 10 illustrates an example of a battery charging apparatus.

FIG. 10 illustrates an example of a battery charging apparatus 1000.

Referring to FIG. 10, the battery charging apparatus 1000 includes an interface 1010 and a processor 1020.

The interface 1010 receives a battery physical quantity. For example, the interface receives a battery voltage measured by a sensor.

The processor 1020 determines a battery overpotential while a battery is being charged in an initial charging step determined in advance. In this example, the processor 1020 determines the battery overpotential based on a battery physical quantity corresponding to a charging capacity of the battery and a reference physical quantity corresponding to the charging capacity of the battery. Additionally, the processor 1020 determines whether a condition for changing a battery charging step is satisfied based on the battery overpotential. Also, the processor 1020 changes the battery charging step from the initial charging step to an adjusted charging step when the condition is satisfied.

Since the descriptions provided with reference to FIGS. 1 through 9 are also applicable to FIG. 10, repeated descriptions with respect to FIG. 10 have been omitted for increased clarity and conciseness.

Figure 11:
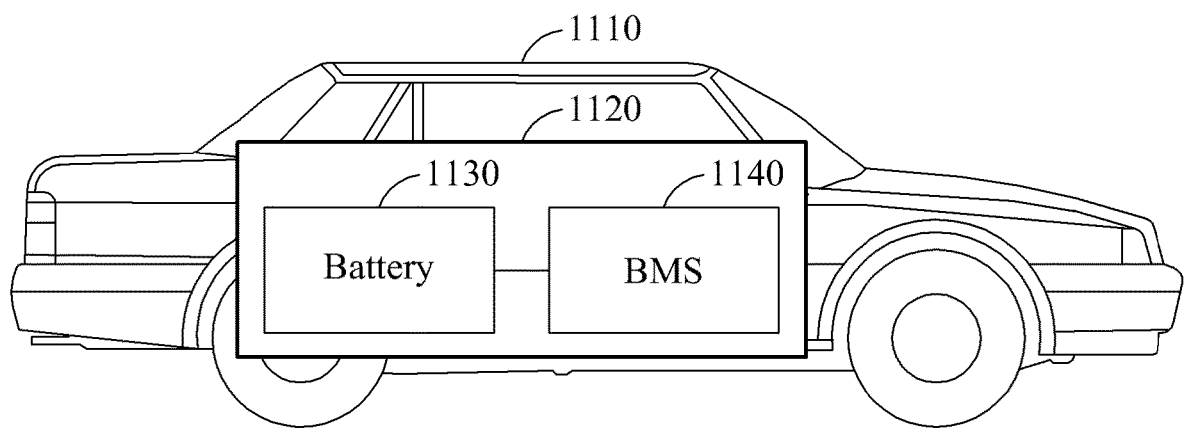
FIG. 11 illustrates an example of a charging system including a battery charging apparatus.

FIG. 11 illustrates an example of a charging system including a battery charging apparatus.

Referring to FIG. 11, a charging system is, for example, an electric vehicle 1110, and the electric vehicle 1110 includes a battery system 1120.

The battery system 1120 includes a battery 1130 and a battery management system (BMS) 1140. The battery 1130 includes, for example, a battery module or a battery cell. The BMS 1140 includes, for example, the battery charging apparatus of FIG. 10.

In one example, a fast charging command is generated, and the battery charging apparatus charges the battery 1130 in a fast charging mode. Before the fast charging mode is applied, to prevent a battery internal shock of the battery 1130 due to the fast charging mode, the battery charging apparatus charges the battery 1130 in a slow charging mode. Since the foregoing descriptions provided with reference to a charge performed in the slow charging mode are also applicable to FIG. 11, repeated descriptions have been omitted. For example, the fast charging command may be generated by the battery charging apparatus, the BMS 1140, or the electric vehicle 1110.

The fast charging mode includes a plurality of battery charging steps, and the battery charging apparatus charges the battery 1130 in an initial charging step of the fast charging mode. The battery charging apparatus monitors, for example, a charging time, a charging voltage, and a battery overpotential. For example, when the battery overpotential is greater than or equal to a threshold voltage, the battery charging apparatus terminates the initial charging step and charges the battery 1130 in a subsequent battery charging step.

When a fast charging is repetitively performed without monitoring or controlling the battery overpotential, a battery life of the battery 1130 may be radically reduced. Accordingly, the battery charging apparatus performs the fast charging while maintaining a battery overpotential corresponding to a degree of degradation in the battery life of the battery 1130 below a threshold voltage. This significantly reduces the degree of degradation in the battery life of the battery 1130 despite repetition of the fast charging.

Since the descriptions provided with reference to FIGS. 1 through 10 are also applicable to FIG. 11, repeated descriptions with respect to FIG. 11 have been omitted for increased clarity and conciseness.

Figure 12:
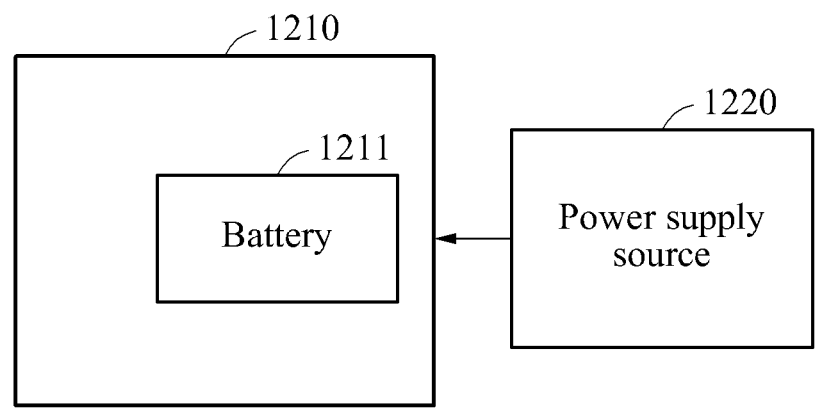
FIG. 12 illustrates another example of a charging system including a battery charging apparatus.

FIG. 12 illustrates another example of a charging system including a battery charging apparatus.

Referring to FIG. 12, the charging system includes a terminal 1210 and a power supply source 1220. The terminal 1210 is a mobile device, for example, a smartphone, a laptop computer, a tablet PC, or any other kind of mobile device known to one of ordinary skill in the art. Although FIG. 12 illustrates the terminal 1210 including a battery 1211 as an example, the disclosure is not limited thereto. For example, the battery 1211 may be separable from the terminal 1210, and may be configured to be charged separately from the terminal 1210.

In one example, the battery charging apparatus of FIG. 10 is included in the power supply source 1220. The power supply source 1220 supplies power to the terminal 1210 to charge the battery 1211. The power supply source 1220 is connected to the terminal by a wired connection or a wireless connection. The power supply source 1220 supports a fast charging mode. Thus, the power supply source 1220 charges the battery 1211 in the fast charging mode when a fast charging command is generated. For example, the fast charging command may be generated by the battery charging apparatus or the terminal 1210.

In another example, the terminal 1210 includes the battery 1211 and a battery management apparatus (not shown) configured to manage the battery 1211. For example, the battery charging apparatus of FIG. 10 is included in the battery management apparatus included in the terminal 1210. For example, the battery management apparatus may be implemented by a processor. When a fast charging command is generated, the battery management apparatus charges the battery 1211 in the fast charging mode. In the fast charging mode, the battery management apparatus monitors a battery overpotential. When the battery overpotential is greater than or equal to a threshold voltage, the battery management apparatus terminates a battery charging step. Thereafter, the battery management apparatus charges the battery 1211 in a subsequent battery charging step. For example, the fast charging command may be generated by the battery management apparatus in the terminal 1210, or by the terminal 1210.

Since the descriptions provided with reference to FIGS. 1 through 10 are also applicable to FIG. 12, repeated descriptions with respect to FIG. 12 have been omitted for increased clarity and conciseness.

The battery charging apparatus 1000 and the processor illustrated in FIG. 10, battery system 1120 and the battery management system 1140, and the terminal 1210 and the power supply source illustrated in FIG. 12 that perform the operations described herein with respect to FIGS. 1-12 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-12. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 8, and 9 that perform the operations described herein with respect to FIGS. 1-12 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery charging method, comprising:
    operating in a first charging mode including plural charging steps, wherein it is determined whether a condition is satisfied in each of the plural charging steps, the condition comprising a first condition in which a battery overpotential of a battery is greater than or equal to a threshold voltage;
    charging the battery in a first charging step of the plural charging steps, wherein charging current in the first charging step is constant charging current;
    changing from the first charging step to a second charging step of the plural charging steps, in response to the first condition being satisfied in the first charging step; and
    charging the battery in the second charging step, wherein charging current in the second charging step is constant charging current,
    wherein the battery is continually charged without rest time in the plural charging steps, during the operating in the first charging mode, and
    wherein the battery is charged in a second charging mode before the operating in the first charging mode, a charging current in the first charging mode being greater than a charging current in the second charging mode.

2. The battery charging method of claim 1, wherein an intensity of a charging current in the second charging step is less than an intensity of a charging current in the first charging step.

3. The battery charging method of claim 1, further comprising selecting the first charging step from a plurality of first charging steps based on a measured voltage of the battery.

4. The battery charging method of claim 1, further comprising:
measuring a voltage of the battery before the charging of the battery in the first charging step; and
selecting the first charging step from a plurality of first charging steps in response to the measured voltage being greater than a voltage corresponding to the first charging step, and the measured voltage being less than a voltage corresponding to the second charging step.

5. The battery charging method of claim 1, wherein the battery overpotential is determined based on a difference between a voltage value of the battery and a reference voltage value.

6. The battery charging method of claim 1, wherein the condition further comprises a second condition in which a charging time of the battery in the first charging step is greater than or equal to a duration of the first charging step.

7. The battery charging method of claim 1, wherein the condition further comprises a third condition in which a voltage of the battery in the first charging step is greater than or equal to a voltage corresponding to the first charging step.

8. A battery charging method, comprising:
operating in a first charging mode including plural charging steps, wherein it is determined whether a condition is satisfied in each of the plural charging steps, the condition comprising a first condition in which a battery overpotential of a battery is greater than or equal to a threshold voltage;
charging the battery in a first charging step of the plural charging steps, wherein charging current in the first charging step is constant charging current;
changing from the first charging step to a second charging step of the plural charging steps, in response to the first condition being satisfied in the first charging step; and
charging the battery in the second charging step, wherein charging current in the second charging step is constant charging current,
wherein a voltage of the battery is monitored during the plural charging steps, and
wherein the battery is charged in a second charging mode before the operating in the first charging mode, a charging current in the first charging mode being greater than a charging current in the second charging mode.

9. The battery charging method of claim 8, wherein an intensity of a charging current in the second charging step is less than an intensity of a charging current in the first charging step.

10. The battery charging method of claim 8, further comprising selecting the first charging step from a plurality of first charging steps based on a voltage which is measured before the charging of the battery in the first charging step.

11. The battery charging method of claim 8, further comprising:
measuring a voltage of the battery before the charging of the battery in the first charging step; and
selecting the first charging step from a plurality of first charging steps in response to the measured voltage being greater than a voltage corresponding to the first charging step, and the measured voltage being less than a voltage corresponding to the second charging step.

12. The battery charging method of claim 8, wherein the battery overpotential is determined based on a difference between a voltage value of the battery and a reference voltage value.

13. The battery charging method of claim 8, wherein the condition further comprises a second condition in which a charging time of the battery in the first charging step is greater than or equal to a duration of the first charging step.

14. The battery charging method of claim 8, wherein the condition further comprises a third condition in which a voltage of the battery in the first charging step is greater than or equal to a voltage corresponding to the first charging step.

15. A battery charging apparatus comprising:
a memory configured to store one or more instructions; and
a processor coupled to the memory,
wherein, when executing the one or more instructions, the processor is configured to:
operate in a first charging mode including plural charging steps, wherein it is determined whether a condition is satisfied in each of the plural charging steps, the condition comprising a first condition in which a battery overpotential of a battery is greater than or equal to a threshold voltage,
charge the battery in a first charging step of plural charging steps, wherein charging current in the first charging step is constant charging current,
change from the first charging step to a second charging step of the plural charging steps, in response to the first condition being satisfied in the first charging step, and
charge the battery in the second charging step, wherein charging current in the second charging step is constant charging current,
wherein the battery is continually charged without rest time in the plural charging steps, during the operation in the first charging mode, and
wherein the batter is charged in a second charging mode before the operating in the first charging mode, a charging current in the first charging mode being greater than a charging current in the second charging mode.

16. The battery charging apparatus of claim 15, wherein an intensity of a charging current in the second charging step is less than an intensity of a charging current in the first charging step.

17. The battery charging apparatus of claim 15, wherein the processor is further configured to select the first charging step from a plurality of first charging steps based on a measured voltage of the battery.

18. The battery charging apparatus of claim 15, wherein the processor is further configured to:
measure a voltage of the battery before the charging of the battery in the first charging step, and
select the first charging step from a plurality of first charging steps in response to the measured voltage being greater than a voltage corresponding to the first charging step, and the measured voltage being less than a voltage corresponding to the second charging step.

19. The battery charging apparatus of claim 15, wherein a voltage of the battery is monitored during either one or both of the first charging step and the second charging step.

* * * * *